June 30, 1970 — T. R. PRYOR — 3,517,998
OPTICAL DOPPLER RADAR DEVICE
Filed Dec. 18, 1968 — 2 Sheets-Sheet 1
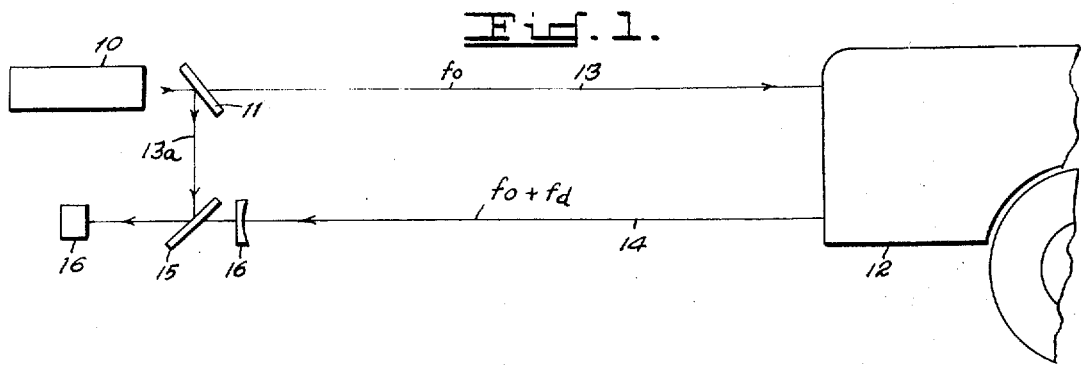
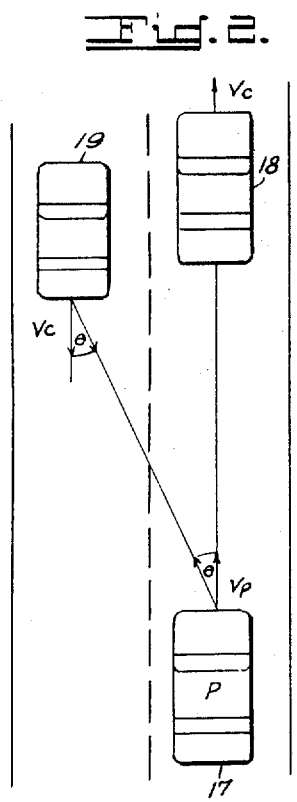
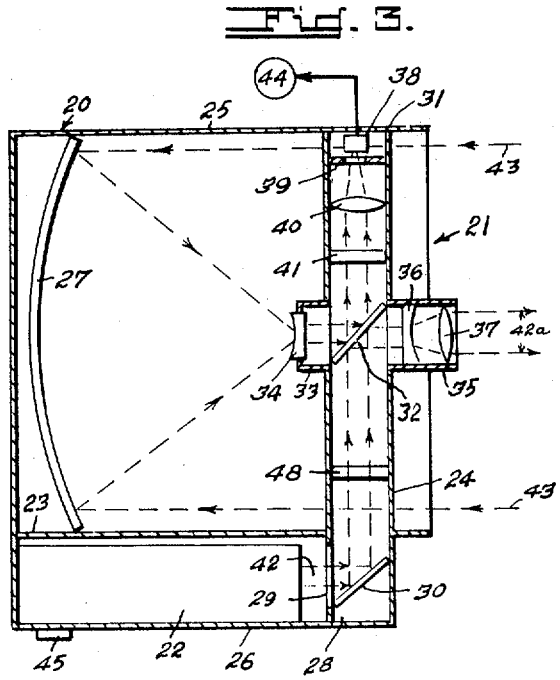
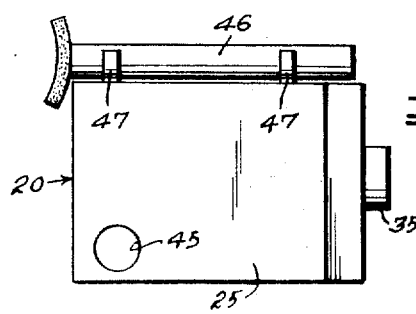
INVENTOR,
Timothy R. Pryor
BY: Harry M. Saragovitz,
Edward J. Kelly &
R. P. Gibson
ATTORNEYS.

INVENTOR
Timothy R. Pryor

United States Patent Office 3,517,998
Patented June 30, 1970

3,517,998
OPTICAL DOPPLER RADAR DEVICE
Timothy R. Pryor, 5423 York Lane,
Bethesda, Md. 20014
Filed Dec. 18, 1968, Ser. No. 784,680
Int. Cl. G01p 3/36
U.S. Cl. 356—28          3 Claims

ABSTRACT OF THE DISCLOSURE

An optical Doppler radar, operating in the spectrum range including and bounded by the infrared and ultraviolet, wherein a laser beam is split so that one part thereof is directed to a target and another part directed to a photodetector. The radiation reflected by the target is reflected by a concave mirror onto collimating means and superimposed on that part of the laser beam directed to the photodetector whereby a signal modulated at the difference frequency of these two beams is obtained at the output of the photodetector which is indicative of the target velocity. In a second embodiment of the invention an amplitude modulated laser beam is projected towards the target and the reflections therefrom containing shifted amplitude modulation frequencies are superimposed on a portion of the projected beam whereby modulation difference beat frequency signals are obtained at the output of the photodetector. In a third embodiment, a pulsed laser generates two fixed time spaced pulses which are projected to a target which reflects them, but due to target motion the time spacing of the reflected pulses is changed. This change in time spacing of the reflected pulses, available at the output of photodetector in signal form, is fed into computer means which calculates the target velocity in terms of the fixed time spacing of the projected pulses with reference to the change in time spacing of the reflected pulses. A telescope aligned with the longitudinal axis of the transmitted radiation is provided in each of the aforementioned embodiments for the purpose of sighting-in the target vehicle prior to illumination of the target vehicle by the optical radar.

---

The invention described herein may be manufactured, used, and licensed by or for the Government for governmental purposes without the payment to me of any royalty thereon.

Present police microwave radars do not have the directionality to enable their use on targets over 500 yards distant or to discriminate between closely packed cars at lesser ranges. Further, such devices cannot be operated from a moving vehicle and are poorly suited for helmet mounting. The laser optical radar of the invention which has much greater beam directionality can be mounted on and can be operated from a moving vehicle.

Accordingly, it is a primary object of the invention to provide a compact optical radar that can be used in a fixed position or from a moving vehicle or aircraft, or made integral with an observer's helmet for determining the speed of vehihcles moving away or towards it.

The novel features that are considered characteristic of the invention are set forth with particularity in the appended claims. The invention itself, however, both as to its organization and method of operation as well as additional objects and advantages thereof, will best be understood from the following description taken in conjunction with the accompanying drawings, in the several figures of which like numerals identify like elements and in which:

FIG. 1 is a diagram illustrating the principles of the invention;

FIG. 2 is a diagram illustrating a typical traffic condition;

FIG. 3 is a plan view, partially in section, of an embodiment of the invention;

FIG. 4 is a side elevational view of the optical radar of the invention;

Figure 5:
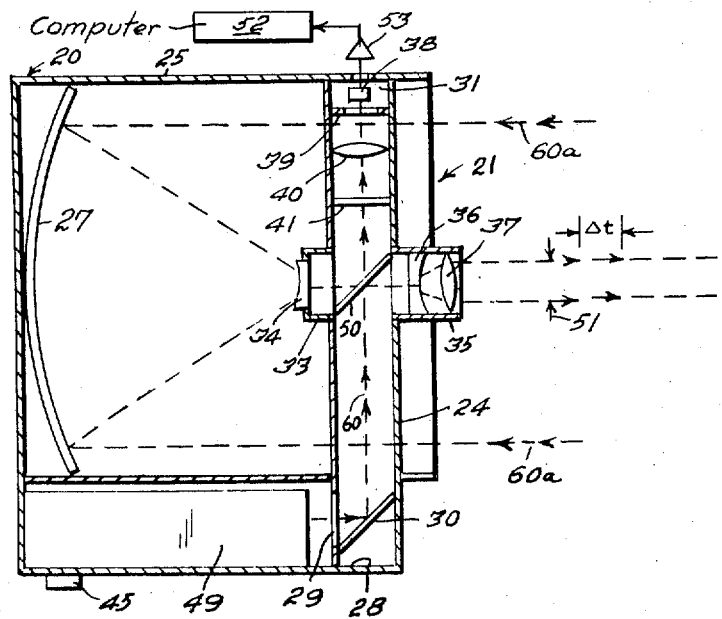
FIG. 5 is a view similar to FIG. 3 illustrating another embodiment of the invention.

Referring now to FIG. 1 which illustrates the principles of the invention wherein a coherent CW beam of light 13 of frequency $fo$ from coherent light source 10 passes through mirror-type beam splitter 11 to the target which may be a vehicle 12 moving towards coherent light source 10. The beam of coherent light reflected by moving vehicle 12 has a frequency of $fo+fd$ where $fd$ is the Doppler frequency and equals $2v/\lambda$, $v$ is the vehicle speed and $\lambda$ which is the source wavelength equals $c/fo$ ($c$ is the speed of light). This reflected radiation 14 is focused onto a mirror-type beam splitter 15 by means of lens 16 and is combined with portion 13a of the beam of light 13 reflected by mirror-type beam splitter 11 by means of mirror-type beam splitter 15 which directs the combined beams onto a photocell 16 whose output is modulated at the difference frequency which is:

$$(fo+fd)-(fo)=fd=2v/\lambda$$

Since $fd$ and the wavelength are known, the velocity $v$ can be obtained.

FIG. 2 shows a typical traffic situation in which a police car 17 provided with laser optical radar of the invention is moving with a velocity $v_p$ and observing a motorist traveling with a velocity $v_c$ in the same or opposite direction as indicated by reference numerals 18 and 19, respectively. The Doppler frequency detected depends on the algebraic difference in velocities, or $v_r$ the relative velocity. In this situation, the angle $\theta$ would usually be small and errors in $\theta$ would be reduced in cos $\theta$. In the situation involving vehicle 18, $\theta$ would be zero.

FIG. 3 illustrates a practical embodiment cross sectional plan view of the invention wherein 20 indicates a housing having an open end 21. Affixed to the end of housing 20 opposite open end 21 is a concave dielectric coated, narrow band, reflection mirror 27 facing the open end 21. Reference numeral 22 indicates a laser housed in a compartment 23 integral with housing 20. Reference numeral 45 indicates a receptacle means for coupling a power supply to laser 22 which is not necessary when the power supply is integral with the laser assembly. A tubular member 24 is supported between vertical walls 25 and 26 of housing 20 adjacent the open end 21 with its longitudinal axis spaced from and centered on mirror 27. End 28 of tubular member 24 is formed with an aperture 29 facing laser 22 and has affixed therein a mirror 30 disposed at an angle of 45° to aperture 29 for reflecting the laser beam towards the opposite end 31 of the tubular member 24. Intermediate ends 28 and 31 is a mirror-type beam splitter 32 aligned with the center of mirror 27 and oriented at an angle of 45° thereto in the same plane as mirror 30. A tubular member 33 projecting into housing 20 is formed in one side of tubular member 24 has affixed therein a concave lens 34 aligned with the center of mirror 27 and mirror-type beam splitter 32. A tubular projection 35 formed in the tubular member 24 opposite tubular projection 33 and axially aligned with tubular projection 33 houses a lens system comprising a concave lens 36 and convex lens 37 which is in alignment with mirror-type beam splitter 32 and through which the laser beam reflected by beam splitter 32 passes to the target and whereby the laser beam cross sectional area is increased as indicated by reference numeral 42a. A photodetector 38 is housed in end 31 of tubular member 24. In close proximity to photodetector 38 is a slit member 39 preceded by a convex lens 40 and a narrow bandpass-filter 41 which is located between lens 40 and mirror-type beam splitter 32 in tubular member 24 in alignment with the beam splitter. A telescope 46, FIG. 4, is affixed to the top of housing 20 parallel to the axis of transmitted beam of substantially coherent light 42a by mounting means 47 for the purpose of sighting-in the target vehicle.

In practicing the invention, the housing 25 is mounted on means, not shown, affixed to the patrol vehicle for vertical and horizontal scanning. When laser 22 is activated by means, not shown, controlled by the observer, the coherent beam of light 42 generated by laser 22 is directed at mirror 30 which reflects it onto mirror-type beam splitter 32 whereby the substantially coherent beam of light 42 to a great degree is directed to lens system comprising concave lens 36 and double convex lens 37 whose foci coincide causing the beam area to increase, and to a lesser degree to photodetector 38 through narrow bandpass filter 41, double convex lens 40 and slit 39. The coherent beam radiation emerging from lens system comprising lens 36 and 37 is directed to the sighted target, for example, a moving vehicle which reflects the radiation, indicated by reference numeral 43 in FIG. 3, onto concave dielectric coated narrow band reflection mirror 27 which in turn directs the reflected radiation to negative lens 34 having the same focal point as concave mirror 27. Thus, the reflected radiation is reduced in area, collimated and impinges on mirror-type beam splitter 32 which reflects it towards photodetector 38 and superimposes it on that portion of coherent beam 42 passed through mirror-type beam splitter 32 to photodetector 38. These coincident beams pass through narrow band filter 41, are converged by lens 40, reduced by slit 39 and strike the surface of photodetector 38. In response to these two beams, photodetector 38 produces a signal modulated at the difference frequency of the two beams which is read out, for example, by frequency meter means 44 coupled to the output of photodetector 38 and calibrated to indicate target velocity.

Also shown in FIG. 3 is a means for amplitude modulating the coherent beam of light 42 generated by laser source 22. In this embodiment of the invention the modulator comprises a KDP crystal 48 positioned in tubular member 24 intermediate mirror 30 and beam splitter 32 in the path of the coherent beam of light 42. The crystal 48 is excited by an electric field, not shown, and the modulation frequency $fm$ is selected to be sufficiently high, preferably $lgc$, so that accurate velocity measurements may be made. The amplitude modulated laser beam projected towards the target and the target reflections thereof are optically processed as described above in connection with the unmodulated laser beam.

In the amplitude modulated optical radar, a target with velocity $v$ shifts the modulation frequency $fm$. The reflection of the target projected amplitude modulated laser beam which contain the shifted amplitude modulation frequencies are superimposed on the portion of the amplitude modulated laser beam passed by beam splitter 32 to photodetector 38 whereby difference frequency beat signals $$\Delta fm = \frac{2V}{c} \cdot fm$$

is obtained thereby which are applied to photodetector 38 producing corresponding electrical signals at the output thereof coupled to frequency meter 44.

FIG. 5 illustrates another embodiment of the invention wherein the housing 20 is identical to the housing of the optical Doppler radar shown in FIG. 3, but the optical system therein is modified to accommodate a pulsed laser radar wherein two time spaced short laser pulses 60 are projected towards a target vehicle. Reference numeral 49 indicates the pulse laser source such as a Q-switch rubby laser trigger to produce two predetermined time spaced short laser pulses affixed in the same position in housing 20 as laser 22. The modification to the optical system consists in the substitution of a total reflecting mirror 50 for the beam splitter 32 of FIG. 3. The total reflecting mirror 50 is also positioned in tubular member 24 intermediate its ends 28 and 31 in the same plane as mirror 30 and in alignment with the optical systems in tubular projections 33 and 35. In operation, when an observer has sighted-in a target vehicle he triggers the pulse laser source 49 by well known means, not shown, whereupon two predetermined time spaced short laser pulses 60 are generated and strike mirror 30 which reflects them through tubular member 24 to total reflecting mirror 50 which in turn reflects the two predetermined time spaced laser pulses through the lens system comprising concave lens 36 and double convex lens 37 whose foci coincide whereby the cross sectional area of the pulses are increased as indicated by reference numeral 51, and projected to the target vehicle. The two predetermined time spaced laser pulses 60 of increased cross sectional area are reflected by the target vehicle, but due to the target vehicle movement the reflections 60a of the projected two predetermined time spaced laser pulses of increased cross sectional area have a time spacing therebetween varying from the predetermined time spacing of the aforementioned projected laser pulses 60 which is utilized in conjunction with the predetermined time spacing in computer 52 for calculating the target velocity.

The reflections 60a of the predetermined time spaced laser pulses 60 are received by concave, dielectric coated, narrow band mirror 27 which focuses them on negative lens 34 having the same focal point as concave mirror 27. Thus reflections 60a are reduced in cross sectional area, collimated and caused to impinge on the total reflection mirror 50 which reflects them onto photodetector 38 through narrow band filter 41, converging lens 40 and slit 39 whereby two spaced signals are produced at the output of photodetector 38 which are coupled by means of amplifier 53 to the counter of computer 52 provided with digital readout means. The time interval between these spaced signals is dependent upon the target vehicle velocity. The signal produced at the output of photodetector 38 in response to the first received reflection of the two reflections 60a starts the counter of computer 52 and the second signal produced at the output of photodetector 38 in response to the second received reflection of the two reflections 60a stops the counter whereby the time interval between the reflected pulses due to the target vehicle velocity is set up in the computer 53.

Computer 53 which is provided with a digital readout for indicating the target vehicle velocity is programmed to solve the following equation for target vehicle velocity:

$$v = c \left[ \frac{t_c - \Delta T}{t_c + \Delta T} \right]$$

wherein
  $v$ = target velocity.
  $c$ = speed of light.
  $\Delta T$ = predetermined, fixed time spacing between the first and second laser pulses projected towards the target.
  $t_c$ = time read on computer counter = $(t_2 - t_1)$.
  $t_2 - t_1$ = time difference (spacing) between the received reflected laser pulses.

Figure 6:
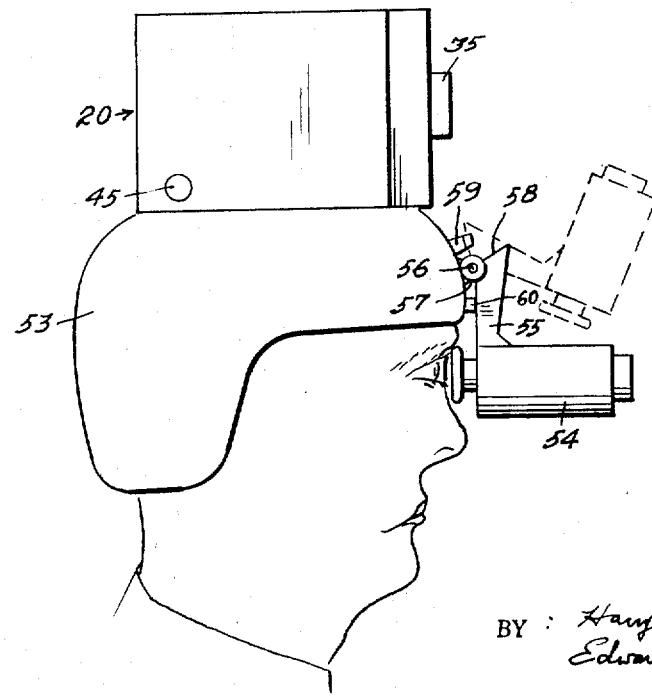
FIG. 6 is a side elevational view of the helmet mounted laser optical radar.

FIG. 6 illustrates a helmet mounted system comprising a compact laser radar affixed to a helmet which is provided with target sighting binoculars. The compact laser radar may consist of laser radars shown in FIG. 3 and FIG. 4 wherein the housing 20 contains the laser source and optical systems. In the instant embodiment housing 20 is affixed to the top of a rigid helmet 53 worn by the observer and oriented so that the laser beam is directed forward of the observer. Binoculars 54 provided with cross-hair sights are boresighted parallel to the radar beam axis and are pivotally mounted on the front of helmet 53 by means of arm 55 which couples the binoculars to pivot means 56 attached to helmet 53. The parallel relationship between the binoculars and the radar beam axis is assured by a stop means 60 positioned on the front of helmet 53 in cooperative relationship with arm 55. Locking means 57 mounted on pivot means 56 prevents the binoculars from pivoting about pivot means 56. When not in use, binoculars 54 are swung upward until edge 58 engages clip 59 mounted on the front of helmet 53 whereby the binoculars are releasably held in a vertical position as indicated by the dotted lines. In operation, the observer sights the vehicle target through the binoculars 54 and when said target appears in line with the cross hairs he triggers the laser radar through switch means, not shown, resulting in the said target speed being indicated on the read out means such a calibrated frequency meter 44 on computer 52 which may be conveniently oriented with respect to the observer.

I claim:

1. An optical Doppler radar adapted for mounting on a moving vehicle to measure the velocity of a target vehicle comprising, a housing provided with an open end, a concave mirror affixed in the housing adjacent a closed end thereof and facing the open end, a laser for generating a coherent beam of light positioned in the housing and directed towards the open end, an optical housing having the two ends thereof supported between two vertical walls of the housing adjacent said open end with the longitudinal axis thereof spaced from and parallel to said concave mirror and having formed thereon intermediate the ends thereof at right angles to the longitudinal axis two oppositely exteriorly extending projections in alignment with the center of the concave mirror, an aperture formed in the optical housing adjacent one end thereof in alignment with the laser, a mirror angularly affixed in the optical housing adjacent said one end and opposite said aperture, a mirror-type beam splitter affixed in the optical housing intermediate the ends thereof in the same plane as said mirror and disposed in same angular plane as said mirror and along the longitudinal axis of the two oppositely exteriorly extending projections, one of said oppositely exteriorly extending projections directed towards said open end and supporting an optical system therein for increasing the cross sectional area of the coherent beam of light of said laser directed therethrough to the target vehicle, a photodetector affixed in the optical housing adjacent another end thereof, a slit member in the optical housing adjacent the photodetector, a narrow band-pass filter in the optical housing adjacent to the mirror-type beam splitter, a converging lens in the optical housing intermediate the narrow band-pass filter and slit member, said coherent beam of light being deflected by said mirror onto the mirror-type beam splitter which passes a small portion of the coherent beam of light onto the photodetector through the narrow band-pass filter, converging lens and slit member, and reflects a greater portion thereof through the optical system in the said one of the oppositely exteriorly extending projections whereby the cross sectional area of the coherent beam of light is increased and directed onto the target vehicle, said concave mirror comprising receiver means for receiving the radiation reflected by the target vehicle in response to the coherent beam of light of increased area directed thereto, a negative lens affixed in the other of the oppositely exteriorly extending projections for collimating the reflected radiation focused thereon by said concave mirror whereby a collimated beam of said reflected radiation is directed onto the mirror-type beam splitter which superimposes the said collimated beam of reflected radiation on the portion of the coherent beam of light passed by the mirror-type beam splitter to the photodetector causing a signal at the output thereof modulated at the difference frequency of the coherent beam of light and said collimated beam of reflected radiation, means responsive to said difference frequency calibrated in vehicle velocity coupled to the output of the photodetector, and a telescope affixed to said radar and whose longitudinal axis is positioned parallel to the longitudinal axis of said coherent beam of light for visually acquiring said target vehicle prior to transmittal of said coherent beam of light.

2. An optical Doppler radar adapted for mounting on a moving vehicle to measure the velocity of a target vehicle comprising, a housing provided with an open end, a concave mirror affixed in the housing adjacent a closed end thereof and facing the open end, a laser for generating a coherent beam of light positioned in the housing toward the open end, an optical housing having the two ends thereof supported between two vertical walls of the housing adjacent said open end with the longitudinal axis thereof spaced from and parallel to said concave mirror and having formed thereon intermediate the ends thereof at right angles to the longitudinal axis two oppositely exteriorly extending projections in alignment with the center of the concave mirror, an aperture formed in the optical housing adjacent one end thereof in alignment with the laser, a mirror angularly affixed in the optical housing opposite said aperture, a mirror-type beam splitter affixed in the optical housing intermediate the ends thereof in the same plane as said mirror and along the longitudinal axis of the two oppositely exteriorly projections, means for amplitude modulating the coherent beam of light affixed in the optical housing intermediate the mirror and the mirror-type beam splitter, an optical system for increasing the cross sectional area of and projecting the amplitude modulated beam of coherent light to the target vehicle housed in one of the oppositely exteriorly projections directed toward said open end, a photodetector affixed in the optical housing adjacent another end thereof, a slit member in the optical housing adjacent the photodetector, a narrow band-pass filter in the optical housing adjacent the mirror-type beam splitter, a converging lens in the optical housing intermediate the narrow band-pass filter and slit member, said coherent beam of light being deflected by said mirror toward said mirror-type beam splitter and amplitude modulated by said means for amplitude modulating, said mirror-type beam splitter passing a small portion of the amplitude modulated coherent beam of light onto the photodetector through the narrow band-pass filter, converging lens and slit member and reflecting a greater portion thereof through the optical system in the said one of the oppositely exteriorly extending projection whereby the cross sectional area of the amplitude modulated coherent beam is increased and thus projected to the target vehicle, said concave mirror comprising receiver means for receiving the vehicle target reflections of the amplitude modulated coherent beam of light, a negative lens affixed in the other of the oppositely exteriorly extending projections for collimating said reflections focused thereon by said concave mirror whereby an amplitude modulated beam of coherent light is directed onto the mirror-type beam splitter which superimposes the coherent beam of amplitude modulated light so generated on said small portion of the amplitude modulated coherent beam of light and directs these two beams through the narrow band-pass filter, converging lens and slit member onto the photodetector to produce a signal at the output thereof modulated at the difference frequency of these beams, means responsive to the difference frequency calibrated to indicate target vehicle velocity, and a telescope affixed to said radar and whose longitudinal axis is positioned parallel to the longitudinal axis of said coherent beam of light for visually acquiring said target vehicle prior to transmittal of said coherent beam of light.

3. An optical radar for measuring the velocity of a target vehicle comprising, a housing provided with an open end, a concave mirror affixed in the housing adjacent a closed end thereof and facing the open end, a laser for generating two successive short laser pulses of predetermined time separation positioned in the housing toward the open end, an optical housing having two ends thereof supported between two vertical walls of the housing adjacent the open end with the longitudinal axis thereof spaced from and parallel to said concave mirror and having formed thereon intermediate the ends thereof at right angles to the longitudinal axis two oppositely exteriorly extending projections in alignment with the center of the concave mirror, an aperture formed in the optical housing adjacent one end thereof in alignment with the laser, a mirror angularly affixed in the optical housing opposite said aperture, a total reflecting mirror affixed in the optical housing intermediate the ends thereof in the same plane as said mirror and along the longitudinal axis of the two oppositely exteriorly extending projections, an optical system for increasing the cross sectional area of and projecting the two successive short laser pulses housed in one of the oppositely exteriorly projections directed toward said open end, a photodetector affixed in the optical housing adjacent another end thereof, a slit member in the optical housing adjacent the photodetector, a narrow band-pass filter in the optical housing adjacent the total reflecting mirror, a converging lens in the optical housing intermediate the narrow band-pass filter and slit member, said two successive short laser pulses being deflected by said mirror to the total reflecting mirror which in turn reflects said two pulses through the optical system in said one of the oppositely exteriorly extending projections whereby the cross sectional area of each said two pulses is increased and thus projected to the target vehicle, said concave mirror comprising receiver means for receiving the target vehicle reflections of the two successive laser pulses of increased cross sectional area wherein the time spacing thereof varies from said predetermined time spacing, a negative lens affixed in the other of the oppositely exteriorly extending projections for collimating said reflections focused thereon by the concave mirror whereby two successive light pulses having a time separation varying from said predetermined time separation are directed onto the total reflecting mirror which in turn reflects said two light pulses through the narrow band-pass filter, converging lens and slit means onto said photodetector to produce two output signals, computer responsive to the output signals for computing the target vehicle velocity, and a telescope affixed to said radar and whose longitudinal axis is positioned parallel to the longitudinal axis of said two successive short laser pulses for visually acquiring said target vehicle prior to transmittal of said two successive short laser pulses.

References Cited

UNITED STATES PATENTS

| | | | |
|---|---|---|---|
| 2,520,166 | 8/1950 | Page | 343—8 |
| 2,645,769 | 7/1953 | Roberts | 343—8 |
| 2,977,589 | 3/1961 | Gutton | 343—8 X |
| 3,150,363 | 9/1964 | Finvold | 343—8 X |
| 3,293,438 | 12/1966 | Davis | 343—8 X |
| 3,409,369 | 11/1968 | Bickel | 356—28 |

RODNEY D. BENNETT, Primary Examiner

T. H. TUBBESING, Assistant Examiner

U.S. Cl. X.R.

343—8; 356—29